(12) United States Patent
Emerson et al.

(10) Patent No.: US 7,562,009 B1
(45) Date of Patent: Jul. 14, 2009

(54) LINGUISTIC PROCESSING PLATFORM, ARCHITECTURE AND METHODS

(75) Inventors: Thomas Emerson, Cambridge, MA (US); Benson Margulies, Lexington, MA (US)

(73) Assignee: Basis Technology Corporation, Cambridge, MA (US)

( * ) Notice: Subject to any disclaimer, the term of this patent is extended or adjusted under 35 U.S.C. 154(b) by 524 days.

(21) Appl. No.: 11/387,107

(22) Filed: Mar. 22, 2006

Related U.S. Application Data

(60) Provisional application No. 60/664,824, filed on Mar. 23, 2005.

(51) Int. Cl.
*G06F 17/27* (2006.01)
*G06F 17/00* (2006.01)

(52) U.S. Cl. ........................................ 704/9; 707/104.1

(58) Field of Classification Search ........................ None
See application file for complete search history.

(56) References Cited

U.S. PATENT DOCUMENTS 5,805,775 A * 9/1998 Eberman et al. ............... 706/11
6,553,385 B2 * 4/2003 Johnson et al. .......... 707/104.1

OTHER PUBLICATIONS

McRoy, S. et al. "Uniform knowledge representation for language processing in the B2 system" Natural Language Engineering vol. 3 , Issue 2 (Sep. 1997) pp. 123-145.*
Sowa, J. "Architectures of intelligent systems" IBM Systems Journal, vol. 41, No. 3, 2002.*
Qiong-xin, L. "Multi-agent based IDSS architecture and negotiation mechanism" Natural Language Processing and Knowledge Engineering, 2003. Proceedings. 2003 International Conference on Publication Date: Oct. 26-29, 2003 On pp. 198-202.*
Stefanini, M. "Talisman: a multi-agent system for natural language processing" Advances in Artificial Intelligence, vol. 991, pp. 312-322, 1995.*
Grishman, TIPSTER Text Architecture Design, Version 3.1., Oct. 1998.
Cunningham, Software Architecture for Language Engineering ["SALE"], Ph.D. Thesis, University of Sheffield, Jun. 2000.
Erman, et al, "The HEARSAY-II Speech Understanding System: Integrating Knowledge to Resolve Uncertainty", ACM Computing Survey, 12:213-253, 1980.
Brenner et al., "Intelligent Software Agents", Springer-Verlag, 1998, English Translation, 326 pp.
Bird et al., "Annotation Graphs as a Framework for Multidimensional Linguistic Data Analysis", Proceedings of the 37th Annual Meeting of the Association for Computational Linguistics, 1999.
Bird, et al., "A Formal Framework for Linguistic Annotation", Linguistic Data Consortium, University of Pennsylvania, May 2, 2000.
Carriero, Gelernter et al., "Linda In Context", Communications of the ACM, Apr. 1989, vol. 32, No. 4.

* cited by examiner

*Primary Examiner*—David R Hudspeth
*Assistant Examiner*—Matthew J Sked
(74) *Attorney, Agent, or Firm*—Jacobs & Kim LLP; David Jacobs (57) ABSTRACT

A system and method for natural language processing comprises a blackboard data structure for providing a shared knowledge repository over which a collection of natural language agents can execute processes on the processable data form, each agent being capable of providing a processing resource usable for serving requests to execute a natural language process on the processable data form, and determining, based on their respective capabilities and examination of the blackboard, what requests for processing they can best serve; and a dispatcher for coordinating the work of registered agents, maintaining a high-level description of tasks to be completed to provide a solution to a given natural language engineering problem, and determining the registered agents that best provide a solution to the given natural language engineering problem.

12 Claims, 3 Drawing Sheets

→ (301) Tokenize the RAWTEXT using appropriate tokenizer →

→ (302) Perform sentence boundary disambiguation →

→ (303) Perform POS tagging →

→ (304) Perform Entity Extraction →

→ (305) Perform Normalization →

FIG. 3

LINGUISTIC PROCESSING PLATFORM, ARCHITECTURE AND METHODS

CROSS-REFERENCE TO RELATED APPLICATION

This application for U.S. patent claims the priority of commonly owned provisional application for U.S. patent Ser. No. 60/664,824 filed Mar. 23, 2005 which is incorporated by reference herein as if set forth in its entirety.

FIELD OF THE INVENTION

The present invention relates generally to methods, platforms, software and systems for natural language processing and engineering ("NLP" and "NLE", respectively), and in particular, to novel linguistic processing methods and platforms employing a blackboard architecture.

BACKGROUND OF THE INVENTION

A wide range of information processing systems for commercial and research purposes operate on linguistic data. Such systems, including NLP systems, typically take in information and apply linguistic processing techniques to it, such as dividing a text into units of words, dividing a text into units of sentences, and performing grammatical analysis on a text to determine the parts of speech (POS) of the words.

The input to such a process might be a buffer of text, a file of formatted text, or a set of data that results from some prior analysis. The input text might be in any of a number of languages or formats, and the appropriate steps to process the text can vary depending on the language and format.

Conventional systems use a number of strategies for processing this information, including hard-coded, loosely coupled, and very loosely coupled configurations. The hard-coded systems utilize hard-coded combinations of processing modules and algorithms to perform the required processing. Such systems can operate at high speed, but are typically cumbersome to maintain, extend, configure and update. Adding a new language, or a new analytical operation, can require extensive re-engineering and complex changes to the deployed system.

Very loosely coupled systems operate by dividing the various operations into independent modules that interact via files and/or databases. These systems are easier than hard-coded systems to extend and configure, but are slow, since the data must be read and written from slow storage media at each step in the process.

Loosely coupled systems operate by sharing data in memory between operations, but use formats in memory that require all the operations to be written in a common programming language, or require extensive parsing operations. XML systems, for example, can exhibit both of these characteristics: if the XML is stored in memory as a character string, then each processing module must parse the string before processing any data. If it is stored as a complex data structure (such as a DOM), then all the modules must be written in a single runtime environment to access the data.

Conventional NLP approaches may also be hampered by character encoding schemes. In particular, many existing text processing systems use legacy character encodings to represent text. This restricts these systems to handling one or a small number of languages at a time. Few systems use Unicode, which permits the system to operate on text in any language.

Several existing systems, particularly in the area of Artificial Intelligence, allow software modules to evaluate their applicability to particular data or to "bid" on input data.

A number of architectures have been proposed or implemented for NLP, including, for example, those described in the following papers, each of which is incorporated herein by reference as if set forth herein in its entirety:

Grishman, TIPSTER Text Architecture Design, Version 3.1., October, 1998, which describes a pipeline architecture; and Cunningham, Software Architecture for Language Engineering ["SALE"], Ph.D. Thesis, University of Sheffield, June 2000, describing, among other aspects, what the author refers to as a General Architecture for Text Engineering ("GATE").

The TIPSTER, SALE and GATE disclosures relate to pipeline architectures, which stand in contrast to the blackboard architecture described below in connection with the present invention.

NLP and NLE are knowledge intensive endeavors, requiring the use of linguistic and extra-linguistic information such as lexica, language models, grammars, and script features. Substantially all non-trivial NLP systems or applications use these types of knowledge to one degree or another.

Accordingly, it would be desirable to provide a linguistic processing platform architecture that can support multiple knowledge sources in a consistent, extensible way, and which facilitates the addition of new or updated sources to an existing NLP system.

Few NLE problems are monolithic; instead, there are typically distinct tasks that support or feed into one another. For example, a part of speech ("POS") tagger typically requires that sentence boundaries have been disambiguated, which often in turn requires that the original text be tokenized. (Examples of such aspects are set forth in commonly owned U.S. patent application Ser. No. 10/883,038 filed Jul. 1, 2004, entitled Method & System for Language Boundary Detection, incorporated by reference herein in its entirety.)

In addition, the tasks themselves may be quite complex; minimalism is neither required nor optimal in many cases. For example, tokenization is a relatively simple task for most languages (with the significant exception of ambiguous punctuation), but is quite difficult for Chinese, Japanese, That or similar languages.

Accordingly, it would be desirable to provide a linguistic processing platform architecture that can support decomposition without requiring it.

It would also be desirable to provide an architecture that enables and facilitates the addition of new linguistic tools to the platform. Thus, for example, not only should it be simple for designers and implementers to add new linguistic components into the framework of the linguistic processing system, but it should also be simple for the designer to provide new or updated components to existing users and customers, which can be "dropped into" existing applications.

It would also be desirable to provide such an architecture that enables designers to provide a substantially complete package of language processing utilities and applications, wherein features can be activated, on a per-feature basis, using an external configuration file.

Still further, it would be desirable to be able to update data sources without requiring users to recompile their libraries.

In addition, it would be desirable to provide a core architecture that is multilingual, or, more particularly, human-language neutral, in that it does not rely on particular scripts or language features. Those skilled in this area of technology will appreciate that NLE components are typically assigned significant computational burdens, and ideally should not have to contend with the vagaries of character encoding and the like.

It would also be desirable to provide an architecture which provides input/output neutrality, in that the NLE components need not be concerned with how text is provided to the system, such that no assumptions are made about the input format, not does the architecture concern itself with the format of output information.

SUMMARY OF THE INVENTION

The invention addresses these needs by providing a novel framework for applying a series of processing operations to linguistic data in a digital processor or digital processing network.

In one aspect of the invention, a linguistic processing system is organized around a central data repository, referred to as the Blackboard, stored in memory. A system in accordance with this aspect of the invention includes:

(1) an Input Processor for receiving an input of text or documents and converting the text or documents into a processable data form, (2) a Linguistic Core in communication with the Input Processor, for processing the processable data form provided by the Input Processor to the Linguistic Core, the Linguistic Core comprising:

a) a Blackboard data structure, for providing a shared knowledge repository over which a collection of natural language processing modules or Agents can execute natural language processes on a processable data form, b) a collection of natural language Agents in communication with the Blackboard, each Agent capable of providing a processing resource that may be usable for serving requests to execute a natural language process on the processable data form, and of determining, based on their respective capabilities and examination of the Blackboard, what requests for processing they can best serve, and c) a Dispatcher, in communication with Agents, among the collection of natural language Agents, that register with the Dispatcher, for coordinating the work of the registered Agents, for maintaining a high-level description of tasks to be completed to provide a solution to a given natural language engineering problem, and for determining the registered Agents that best provide a solution to the given natural language engineering problem, and (3) an Output Processor for converting the output of the Linguistic Core into a desired form, such that the input of text or documents is processed to generate results of the desired form.

Further aspects of the invention include methods and algorithms for implementing the operations and structures described above, using known digital processing components and computer software techniques, and a computer-readable software product for enabling a digital processing system to carry out the operations of the invention.

These and other aspects, examples, practices and embodiments of the invention will next be described in detail, in connection with the attached drawings.

BRIEF DESCRIPTION OF DRAWINGS

The following detailed description of the invention will provide those skilled in the art with an enabling description of the invention, read in connection with the attached drawings, in which.

DETAILED DESCRIPTION OF THE INVENTION

Figure 1:
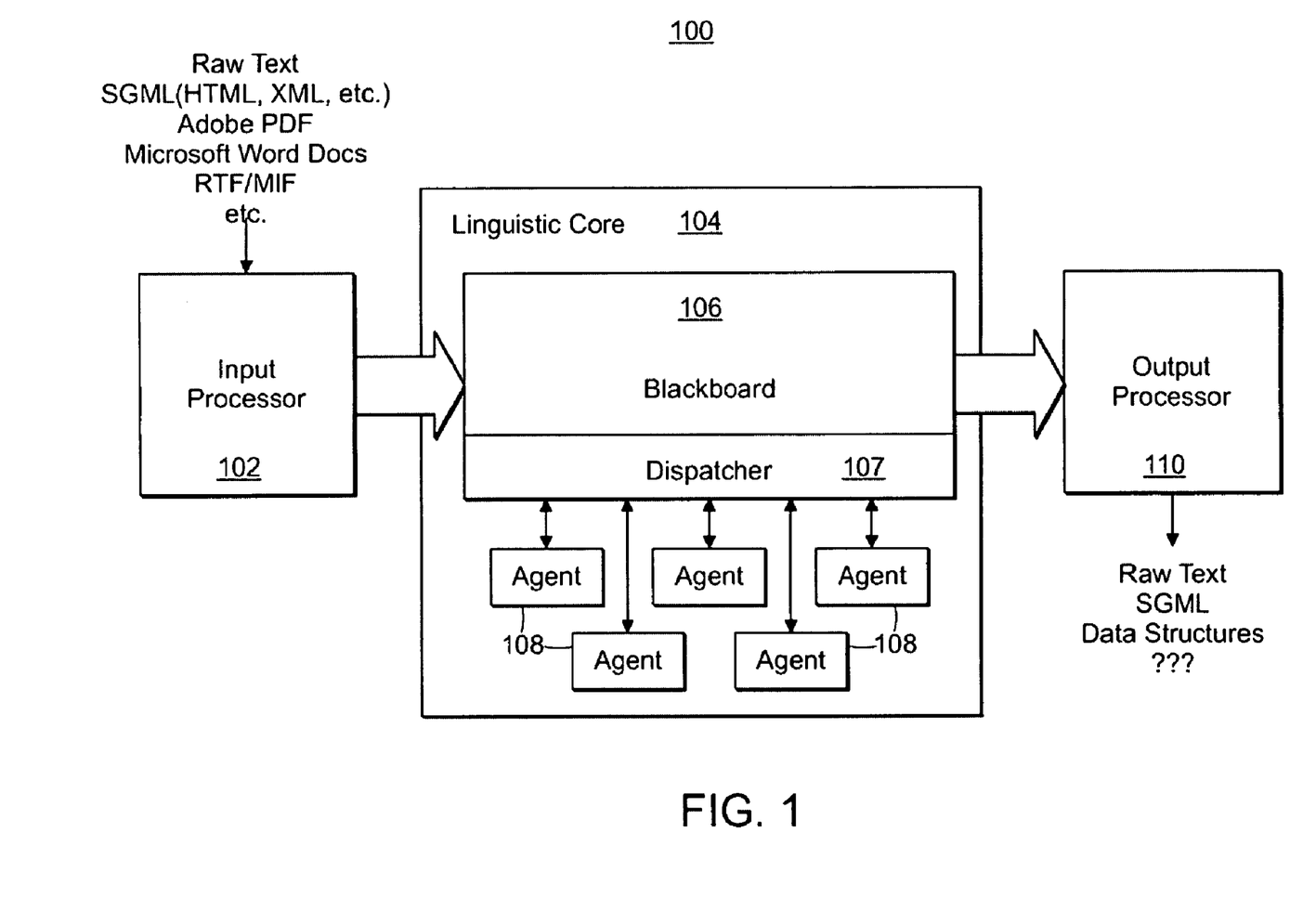
FIG. 1 is a schematic block diagram depicting a natural language processing architecture and structure in accordance with the invention.

Architectural Overview: FIG. 1 is a schematic block diagram showing the high-level aspects of a linguistic processing platform architecture 100 in accordance with one embodiment of the invention. As will be described in greater detail below, the structural elements that comprise the architecture of FIG. 1 can be implemented using known forms of computer hardware elements, including processors, memory and storage, under the control of, and executing the methods of, the invention as described below. By way of example, the architecture shown in FIG. 1 can be implemented in known workstation environments based on conventional computer processing elements, whether networked or standalone, by one skilled in the art, in accordance with the following description.

Referring now to FIG. 1, raw text or documents, in any format such as SGML (Standard Generalized Markup Language), HTML (Hypertext Markup Language), XML (Extensible Markup Language) or the like, Adobe .PDF, Microsoft Word .DOC, RTF/MIF (Rich Text/Maker Interchange Format) or the like, are fed into Input Processor 102. Input Processor 102 operates as described below to convert the documents or text into a data form usable by the Linguistic Processing Core 104, which encompasses a Blackboard 106, a Dispatcher 107 and Agents or Tasks 108, all described below in further detail. The output of the Linguistic Core 104 is then transmitted to an Output Processor 110, which converts the output of the Linguistic Core 104 into a desired format of raw text, SGML data structures, or other.

In one embodiment of the invention, the Input Processor 102 is responsible for converting "original" documents or raw text into UTF-16 (16-bit Unicode strings), which is the internal character representation used by the illustrated embodiment of the linguistic processing architecture. (Technical advantages of using UTF-16 or the like are described more fully below.)

The Input Processor 102 can utilize conventional computer hardware structures, such as an optical scanner and associated digital processors capable of reading text from paper documents and generating a digital representation of the text in a desired format, or a processor capable of reading a pre-existing digital representation of text and converting it into a desired format. It will be understood that many other variations of Input Processor are possible and within the scope of the invention, such as processors that accept audio feeds as input and convert the audio to a digital text representation.

In accordance with one practice of the invention, the Input Processor 102 is responsible for a range of tasks, including detecting the type of a document, extracting text form the document, identifying the language and encoding of the text, extracting structure form the text and transcoding to UTF-16. These operations can be handled, in accordance with known software techniques, by run-time configurable plug-ins.

Alternatively, a minimal implementation of the Input Processor would simply receive UTF-16 text and pass it straight through to the Blackboard 106 of the Linguistic Core 104. Thus, the Input Processor initially need not have any reliance on other software such as CLU or RLI (Rosette Language Identifier, available from Basis Technology, Cambridge, Mass.; see also commonly owned patent application Ser. No. 10/778,676 filed Feb. 13, 2004, and entitled, "Non-Latin Language Analysis, Name Matching, Transliteration, Transcription and Phonetic Search", which application is incorporated by reference in its entirety herein). As yet another alternative, however, the Input Processor of the present invention could utilize the techniques disclosed in the noted patent application Ser. No. 10/778,676.

In addition, the configurable nature of the structure shown enables the provision of platform-specific document converters without affecting other platforms (for example, by writing a wrapper around available Windows COM APIs for extracting text from a Word document).

Referring again to FIG. 1, the Linguistic Core 104 is responsible for the actual text processing performed on the input. In the illustrated embodiment, a collection of NL processes, Tasks or Agents 108 execute over a shared knowledge repository, i.e., the Blackboard 106.

General blackboard architectures have been proposed or implemented in artificial intelligence research, including language processing. One such system was the Hearsay-II speech-understanding system developed in the late 1970's. See, e.g., Erman, et al, "The HEARSAY-II Speech Understanding System: Integrating Knowledge to Resolve Uncertainty", ACM Computing Survey, 12:213-253, 1980, incorporated herein by reference.

However, the structures and functions of the present invention differ from previously-described blackboard architectures in significant ways, as will next be more fully illustrated and described.

In operation, the Blackboard 106 of the present invention contains various types of named notices or attributes, which are written to the Blackboard 106 by the Input Processor 102 (for example, the raw or UTF-16 encoded text of a document, and/or its language, structure information and the like) and by the Agents 108 as they execute processes/tasks. In the embodiment illustrated in FIG. 1, all data posted to the Blackboard are global, in that any Agent can see them. As described in greater detail below, Agents register themselves with the Blackboard, describing their capabilities.

The Blackboard 106 itself can utilize conventional computer hardware structures, such as RAM, memory controller processors, and other known digital memory devices.

Also within the Linguistic Core 104 is the Dispatcher 107, which is responsible for coordinating the work of the registered Agents. For a given high-level NL "problem", for example, named entity extraction, the dispatcher maintains a description or "recipe" of the overall tasks or subtasks that must be completed to arrive at the "solution". (In the example of named entity extraction, this may include tokenization, sentence boundary detection, POS tagging, noun phrase chunking, and entity recognition.)

The recipe does not describe specific task implementations, but instead, a high-level description of such tasks to be executed to solve the given problem. The dispatcher then determines the combinations of registered Agents that best solve the given. This can be accomplished, for example, via a static lookup in its table of registered Agents, or through a broadcast to all registered Agents. In one example, such a broadcast might take a computer-readable form of "Hello! Given the current state of the Blackboard, who among you registered Agents can tokenize the text?" Individual Agents then examine the blackboard and determine whether they can service the request. For example, if the text on the blackboard is in Japanese, and a Japanese tokenizer, such as JLA or other, is available, then it will respond appropriately. If a fallback Agent is not found, then the overall action cannot be solved and an error is returned.

In accordance with the present invention, the distributed nature of the Blackboard—including the fact that Agents are not directly aware of one another—makes this architecture highly configurable and updatable. Each Agent is responsible for its own domain intelligence, and is not tied to any particular implementation of other tasks or Agents.

The Dispatcher 107 can be implemented using conventional computer hardware structures, including CPUs and other processors, memory and memory controllers.

Referring again to FIG. 1, the Output Processor 110 is responsible for packaging the results of the linguistic processing for use by the calling application—the Linguistic Core 104 is not concerned with the final packaging of the results. The output processor scans the Blackboard and decides which data to return to the user. This decision may be based on user preferences, which would be recorded on the Blackboard, or pre-configured settings, or some combination of these and/or other parameters.

Like the other structural elements shown in FIG. 1, the Output Processor 110 can be implemented using conventional digital processor, memory and associated computer hardware elements.

In operation of the structure shown in FIG. 1, the Agents are analogous to autonomous software agents that collectively work to solve a given problem. (By way of background, see, for example, Brenner et al., "Intelligent Software Agents", Springer-Verlag, 1998, incorporated herein by reference.) Through the use of such Agents and the Blackboard/Dispatcher elements of FIG. 1, the architecture of the invention as shown in FIG. 1 is highly flexible, enabling the implementer and system designer to build any number of linguistic applications on top of it.

This level of general applicability and flexibility is similar to that afforded by the TIPSTER system described in the above-noted TIPSTER publication, insofar as the text being analyzed is annotated by one or more "annotators" (i.e., tasks, within the context of the present invention) that are compiled into the system.

However, the present invention differs from TIPSTER in a number of significant ways, including that the tasks and Agents described in connection with the present invention are wholly independent from one another—and are not even aware of each other—and are not explicitly invoked by the user. Instead, the top-level "recipe" is invoked, and the actual tasks to be executed are determined dynamically, based on the features of the data being processed, as determined by the processable data itself, in coordination with the Dispatcher.

Figure 2:
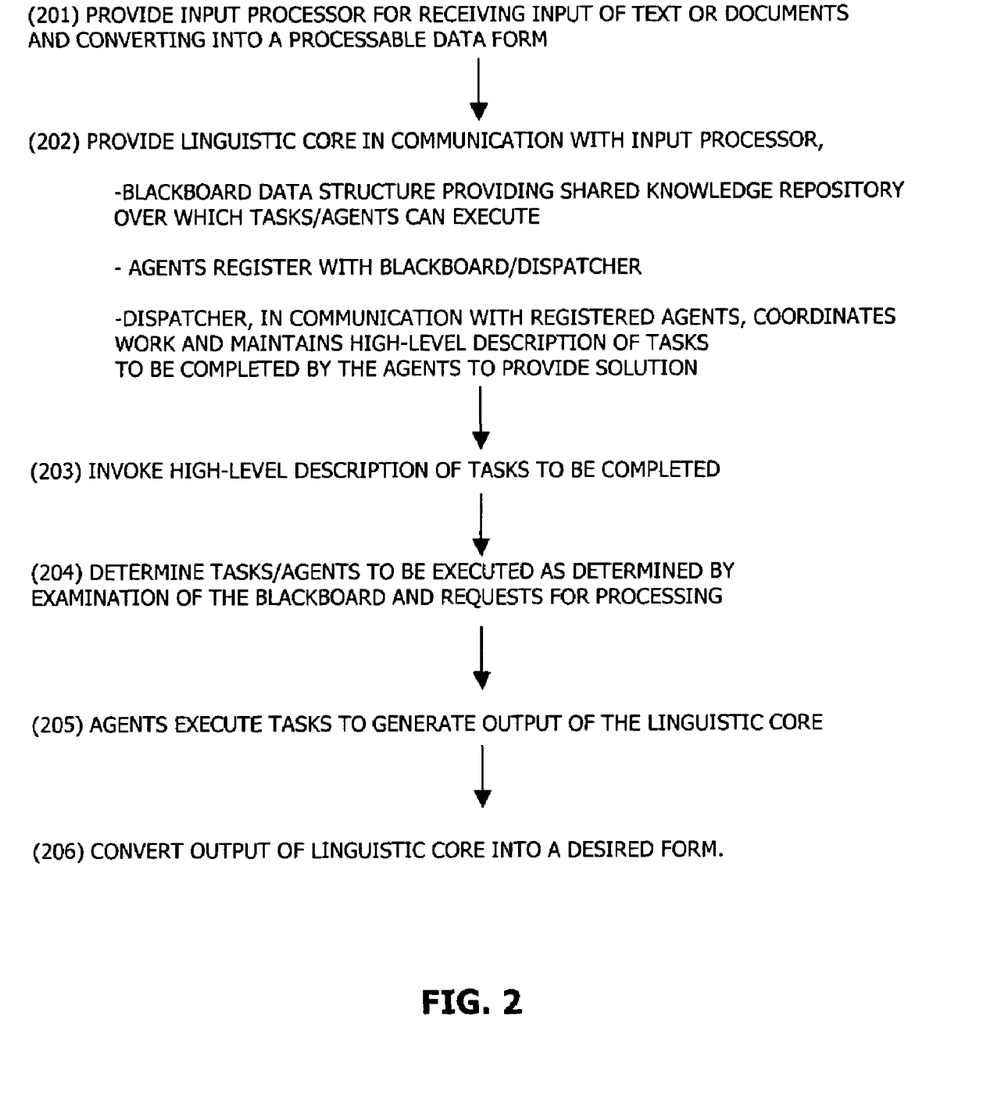
FIG. 2 is a generalized flowchart showing an overall method in accordance with the invention.

Thus, the corresponding method aspects of the structural elements described in connection with FIG. 1 are shown in the generalized flowchart of FIG. 2. As shown in FIG. 2, a generalized method in accordance with the invention can including providing an Input Processor for receiving an input of text or documents and converting the text or documents into a processable data form (201 of FIG. 2), providing a Linguistic Core in communication with the Input Processor, for processing the processable data form provided by the Input Processor to the Linguistic Core (202 of FIG. 2), invoking a high-level description of the tasks to be completed (203), determining the tasks to be executed, based on features of the processable data form being processed, as determined by examination of the Blackboard and requests for processing (204), executing the tasks to generate an output (205), and converting the output into a desired form (206).

The providing and configuring of the Linguistic Core includes configuring the Blackboard data structure, configuring a set of natural language Agents in communication with the Blackboard, and providing a Dispatcher, in communication with the Agents that register with the Dispatcher, for maintaining the high-level description of tasks to be completed to provide a solution to a given natural language engineering problem, and for determining the registered Agents that best provide a solution to the given natural language engineering problem.

Detail of an Exemplary Implementation

The following discussion provides further detail regarding the structure and function of the Blackboard and other aspects of the invention depicted by way of example in FIG. 1, in an exemplary practice of the invention. Those skilled in the art will understand that numerous other variations, modifications, additions and subtractions are possible, and are within the scope of the present invention.

The Blackboard: The Linguistic Core of FIG. 1 sees any language-engineering exercise as a problem for which it must provide a solution through a collection of somewhat autonomous agents (the Tasks of FIG. 1). (The term "Agent" is used in the following discussion of functionality to describe aspects of the processes that communicate with and through the Blackboard to provide a solution to language-engineering problems.)

As noted above, the primary data structure in the Linguistic Core is the Blackboard, which is the shared repository for the linguistic components. In one practice of the invention, all communication between agents occurs through the Blackboard.

Attributes and Annotations: In accordance with the present invention, Agents (or the Input Processor) post attributes to the Blackboard. In one practice of the invention, an attribute consists of a name (a Unicode string) and a value, which may be one of the following:

Boolean
Integer
Floating point number
Annotation
Annotation Reference
String (UTF-16 or the like)

A named attribute can have multiple values associated with it. For example, an attribute named "Sentences" can have several annotations indicating the location of each sentence in the input text.

In particular, an annotation is used to specify information about a portion of a document, and consists of the following:

Primary Type
Secondary Type
Span Start
Span End
Attributes

The Primary and Secondary Types allow fine-grained identification of the type of information being annotated. The Span Start and Span End are the 0-based offsets to the start and the position immediately after the end of the span being annotated. The attributes can be used to add further information to the span, such as part-of-speech (POS) information.

In accordance with the invention, an Annotation Reference refers to an existing annotation. A sentence is comprised of tokens, which are comprised of a span of characters. Hence a "Sentence" attribute may define a span for the sentence as well as a set of annotation references to the individual tokens in the sentence.

The use of attributes and span-based annotations provides a number of technical advantages. For example, it allows duplication to be minimized by storing spans into the converted text instead of making copies of each. Attributes provide a general method for expressing named, typed data to all of the agents in the system.

A set of annotation descriptions can be used to define the namespace for primary and secondary annotation types. These define the vocabulary of the agents for a particular task. Adding new functionality to the system involves adding not only the appropriate agents but also adding the new annotation description files describing the results.

In addition, a set of attribute descriptions can be used to define, at least for agent authors, the set of standard attribute names that Agents can expect to encounter. It is expected that Agents will develop a common set of attributes that will become "standard" as the system is implemented and developed.

Application programming interfaces (APIs) can be created for adding and removing attributes, or portions of attributes, in the case of attributes with multiple values. System developers and implementers can determine the semantics and protocols for removing attributes, such as whether any agent can remove an attribute from the Blackboard. APIs should also be created for getting an iterator over the values of a particular attribute. For example, the POS tagger processes each sentence in the input, and in turn needs to access each token in that sentence. Access to these are provided through the API. The creation and development of such APIs is within the knowledge and ability of those skilled in the relevant art.

The use of annotations and attributes for these problems is a known technique in NL architectures. For example, TIPSTER (see publication cited above and incorporated by reference herein) utilizes this type of representation, as do the annotation graphs set forth in Bird et al., "Annotation Graphs as a Framework for Multidimensional Linguistic Data Analysis", Proceedings of the 37th Annual Meeting of the Association for Computational Linguistics, 1999; and "A Formal Framework for Linguistic Annotation", Linguistic Data Consortium, University of Pennsylvania, May 2, 2000, both incorporated by reference herein as if set forth in their entireties.

The semantics of these constructs are defined by Bird et al., and are also similar to the tuple spaces in the "Linda" programming language, as set forth in Gelernter et al., "Linda In Context", Communications of the ACM, April 1989, Volume 32, No. 4, incorporated by reference herein. They can be readily mapped to other representations, such as Standard Generalized Markup Language (SGML), and are efficient insofar as they minimize the amount of copying that is done on the input.

An Annotation Example: By way of example, the following sets forth possible annotations for the sentence:

"Basis Technology solves your globalization challenges with the Rosette Globalization Platform."

Given this sentence, the illustrated system of the invention can generate these attributes:

TABLE 1

| Attribute Name | Attribute Value | Comment |
| --- | --- | --- |
| RAWTEXT | Basis Technology solves your [ . . . ] Platform. | The raw text to be used by the agents. Provided by the Input Processor. |

TABLE 1-continued

| Attribute Name | Attribute Value | Comment |
| --- | --- | --- |
| RAWTEXTLANG | En | ISO 639 language code. Provided by the Input Processor. |
| RAWTEXTLEN | 94 | The (character) length of RAWTEXT |
| TOKENS | A set of 22 "Token" annotations for each token (including whitespace) in RAWTEXT (see below) | The annotations would be generated by a tokenizer agent. |
| SENTENCES | A set containing a single "Sentence" annotation (see below). | The annotation would be generated from a sentence boundary detector. |

The Token annotations could look like the following (abbreviated):

TABLE 2

| ID | Primary Type | Secondary Type | Span Start | Span End | Attributes |
| --- | --- | --- | --- | --- | --- |
| 1 | Token | Word | 0 | 5 | nil |
| 2 | Token | WS | 5 | 6 | nil |
| 3 | Token | Word | 6 | 16 | nil |

The sentence annotation could look like the following:

TABLE 3

| ID | Primary Type | Secondary Type | Span Start | Span End | Attributes |
| --- | --- | --- | --- | --- | --- |
| 1 | Sentence | nil | 0 | 95 | CONSTITUENTS = TOKENS[1, 2, 3, . . . , 22] |

Note that the "Constituents" attribute to the Sentence annotation is not strictly necessary—it would be possible to infer the correct set of "Tokens" simply by examining the span addresses.

Figure 3:
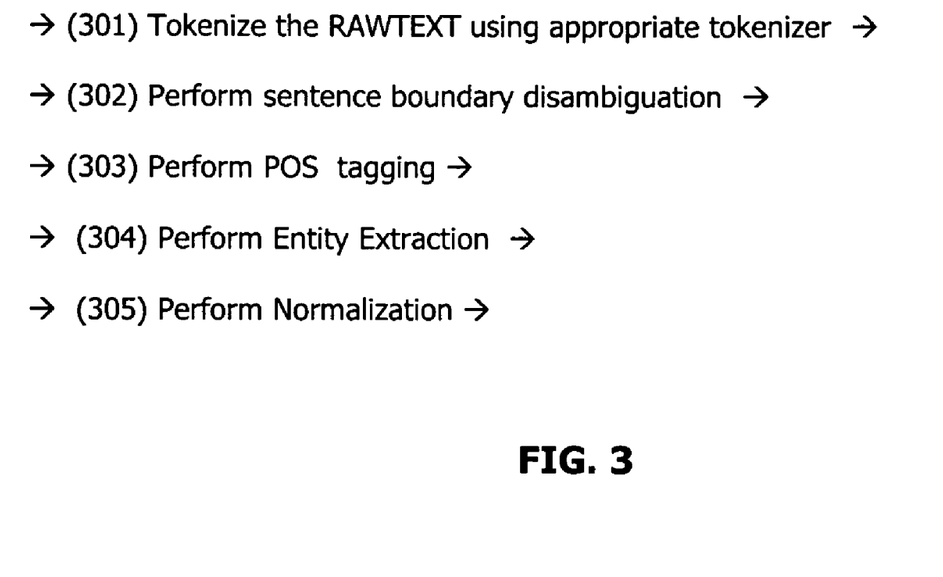
FIG. 3 is a flowchart showing an example of a method in accordance with the invention for executing named entity extraction.

Agent Interaction: The following discussion contains a hypothetical sequence of events that could occur in a named-entity extraction task. It assumes the following Agents, which can each be individually designed in accordance with conventional NL practices, or using the teachings of the commonly owned patent application(s) cited above and incorporated herein by reference:

Tokenizer for English
Tokenizer for Japanese
Sentence Boundary Disambiguator for English
Sentence Boundary Disambiguator for Japanese
POS Tagger for English
POS Tagger for Japanese
Entity Extractor
Date normalizer for Japanese For the purposes of this example, it is assumed that there is a "recipe" defined for named entity extraction, which provides the following steps shown in FIG. 3:

1: Tokenize the RAWTEXT using the appropriate tokenizer (301 of FIG. 3).
2. Perform sentence boundary disambiguation (302).
3. Perform POS tagging (303).
4. Perform Entity Extraction (304).
5. Perform Normalization (305).

These steps outline the essential steps required to perform many named entity recognition tasks. The recipe does not dictate that these tasks be executed serially (and FIG. 3 should not be taken as requiring that these tasks be performed serially). Indeed, it is possible to interleave the operation of these components, taking advantage of data as it becomes available. For example, POS tagging could begin as soon as the first sentence is disambiguated, and sentence disambiguation can start as soon as tokens start appearing from the tokenizer. The nature of the blackboard system of the invention enables this type of parallelism. There is of course no requirement that a particular implementation must or should be multithreaded, but in accordance with the invention, it could be.

Agents register with the Dispatcher, as noted above in connection with FIG. 1, and can indicate the types of events, or the types of attributes they are capable of handling. For example, a POS tagger can ask to be notified each time a Sentence annotation is added to the "SENTENCE" attribute; or the Japanese date normalize could ask to be notified each time a data entity is recorded. Then, as soon as a date is posted to the blackboard, the date normalizer can have at it, perhaps updating the annotation with a normalized form. Hence, normalization goes hand-in-hand with extraction.

Instead of having the operations explicitly controlled by the dispatcher, the agents execute when they decide (either through active inspection of the blackboard or through invocation via the dispatcher when an "event" in which they are interested occurs). Order of execution is implicit in the requirements imposed by each agent—for example, the POS tagger cannot execute until sentence boundaries have been detected. Sentence boundaries cannot be detected until the input text is tokenized, and so on.

The dispatcher determines which set of agents to unleash to solve a particular problem, based on the recipe. At the point where the agents are "collected" the raw text and its various attributes (particularly its language) have been posted. The dispatcher broadcasts a request for a tokenizer that can handle the text on the Blackboard; and the Japanese tokenizer inspects the RawTextLang attribute and determines that it can perform the operation.

If there are multiple Japanese tokenizers available, then the dispatcher can run a process (which can be designed by the system implementer) to decide which one to use.

The dispatcher then performs a similar operation for the next step, sentence boundary detection. For Japanese this is relatively straightforward, and can run independently of the tokenization process.

At this point the Japanese tokenizer is waiting for the segmenter and sentence boundary detector to complete, and then processing will continue. An agent can indicate that it is finished by using a Boolean state attribute or the like.

Other FeaturesNariations: Additional features and/or variations can also be provided. Thus, for example, the invention can utilize a set of standard formats for the data in memory, avoiding the use of any programming-language-specific items. Such "flat" representations consisting of 32-bit integers, UTF-16 strings, UTF-8 strings and memory offsets within the buffer, and the Blackboard is thus operable to store a set of named items, e.g., Attributes or notices, in this representation format, which can be tagged with an identifier.

Moreover, the API for defining operations to be executed can include Initialization; Data Processing (called via this path, an Agent may read any data on the blackboard, create new Attributes/notices on the blackboard, and replace the contents of any notices on the blackboard); and Input Processing (called via this path, an Agent reads data from a memory buffer or external file and converts it into one or more Attributes/notices on the Blackboard). A specification language can also be used for combining Agents into a process. In this aspect of the invention, a specification consists of zero or more named parameters that may be read by Agents; an Input Processor that implements the input processing aspect of the API; and zero or more processors that implement the data processing aspect of the API.

An input aspect of the API for operating on input data can also be specified, in which the API accepts either a memory buffer or an identifier of a file. In operation, the system invokes the Input Processor, then invokes each of the Agents in turn—but as noted above, not necessarily in sequence, since multiple processes, processors and/or Agents can execute or operate at a given time. Each processor/Agent evaluates the existing Attributes/notices on the Blackboard and then makes an adaptive decision whether to perform its operations. For example, an Agent responsible for determining the part of speech of French data will choose not to operate on English data.

The system API can also include features for controlling or specifying the retrieval of data from the Blackboard after the conclusion of a processing run.

Standard Attributes/notices that can be used by the system may include:

RAW_TEXT, a buffer of UTF-16 text for processing;

LANGUAGE, a 32-bit integer indicating the language, whether English, French or other, of the RAW_TEXT;

TOKENS, a vector of UTF-16 strings, representing text subdivided into words;

TOKEN_OFFSETS, a vector of pairs of 32-bit integers, indicating the boundaries of each token in the RAW_TEXT;

SENTENCE_BOUNDARIES, a vector of 32-bit integers, indicating the location in the vector of tokens of sentence termination points;

BASE_NOUN_PHRASES, a vector of pairs of 32-bit integers, indicating the start and end indices of noun phrases in the stream of tokens;

NAMED_ENTITIES, a vector of triples of 32-bit integers, in which each triple contains an entity type (e.g., a person, organization, date), a start index in the tokens, and an end index in the tokens.

CONCLUSION

The invention described herein provides a flexible, easily configurable and updatable architecture for NL processing and engineering. The set of tasks or Agents that are applied to a given input can adapt (or be adapted), automatically and dynamically, to characteristics of the data being processed.

Those skilled in the art will understand that the foregoing detailed description and the attached drawings are provided by way of example only, and they will appreciate that various additions, modifications and other implementations of the invention are possible, and are within the spirit and scope of the invention, which is limited solely by the appended claims.

We claim:

1. A system for natural language processing, comprising:
   (1) an Input Processor for receiving an input of text or documents and converting the text or documents into a processable data form;
   (2) a Linguistic Core in communication with the Input Processor, for processing the processable data form provided by the Input Processor to the Linguistic Core, the Linguistic Core comprising:
   a) a Blackboard data structure, for providing a shared knowledge repository over which a collection of natural language Agents can execute natural language processes on the processable data form,
   b) a collection of natural language Agents in communication with the Blackboard, each Agent capable of providing a processing resource that may be usable for serving requests to execute a natural language process on the processable data form, and of determining, based on their respective capabilities and examination of the Blackboard, what requests for processing they can best serve, and
   c) a Dispatcher, in communication with Agents, among the collection of natural language Agents, that register with the Dispatcher, for coordinating the work of the registered Agents, for maintaining a high-level description of tasks to be completed to provide a solution to a given natural language engineering problem, and for determining the registered Agents that best provide a solution to the given natural language engineering problem; and
   (3) an Output Processor for converting the output of the Linguistic Core into a desired form, such that the input of text or documents is processed to generate results of the desired form;
   wherein Agents or the Input Processor post Attributes to the Blackboard;
   wherein the Attributes comprise a name and a value;
   wherein the value can be Boolean, integer, floating point number, Annotation, Annotation Reference, or string;
   wherein an Annotation is used to specify information about a portion of an input document or text; and
   wherein information in an Annotation comprises Primary Type, Secondary Type, Span Start, Span End, and Attributes.

2. The system of claim 1 wherein the Primary Type and Secondary Type information allow fine identification of the type of information being annotated.

3. The system of claim 2 wherein the Span Start and Span End are 0-based offsets to the start and the position immediately after the end of the span being annotated.

4. The system of claim 3 wherein the Attributes information in an Annotation can be used to add further information to the span.

5. The system of claim 4 wherein the further information can include Part of Speech (POS) information.

6. The system of claim 5 further comprising Annotation References that refer to existing Annotations.

7. The system of claim 6 wherein a set of Annotation Descriptions can be used to define the namespace for primary and secondary annotation types, which define the vocabulary of Agents for a particular task.

8. The system of claim 7 wherein a set of Attribute Descriptions can be used to define a set of standard Attribute names that Agents can expect to encounter.

9. The system of claim 8 wherein Agents collectively develop a common set of Attributes during operation.

10. The system of claim 9 further comprising an Application Programming Interface (API) for adding and removing Attributes or portions of Attributes.

11. A system for natural language processing, comprising:
    (1) an Input Processor for receiving an input of text or documents and converting the text or documents into a processable data form;
    (2) a Linguistic Core in communication with the Input Processor, for processing the processable data form provided by the Input Processor to the Linguistic Core, the Linguistic Core comprising:
    a) a Blackboard data structure, for providing a shared knowledge repository over which a collection of natural language Agents can execute natural language processes on the processable data form, b) a collection of natural language Agents in communication with the Blackboard, each Agent capable of providing a processing resource that may be usable for serving requests to execute a natural language process on the processable data form, and of determining, based on their respective capabilities and examination of the Blackboard, what requests for processing they can best serve, and c) a Dispatcher, in communication with Agents, among the collection of natural language Agents, that register with the Dispatcher, for coordinating the work of the registered Agents, for maintaining a high-level description of tasks to be completed to provide a solution to a given natural language engineering problem, and for determining the registered Agents that best provide a solution to the given natural language engineering problem; and (3) an Output Processor for converting the output of the Linguistic Core into a desired form, such that the input of text or documents is processed to generate results of the desired form;

wherein Agents resister with the Dispatcher and can indicate to the Dispatcher the types of events or attributes they are capable of handling;

wherein Agents execute at times they determine, either through inspection of the Blackboard or through invocation by the Dispatcher when an event in which they have registered capability occurs;

wherein order of execution of Agents is implicit in requirements defined by registration of the Agents; and wherein the Dispatcher can broadcast a request for an Agent having a given capability, and if responses for multiple Agents indicate the given capability, the Dispatcher can determine which Agent to use.

12. A method of natural language processing, comprising:

(1) providing an Input Processor for receiving an input of text or documents and converting the text or documents into a processable data form, (2) providing a Linguistic Core in communication with the Input Processor, for processing the processable data form provided by the Input Processor to the Linguistic Core, the Linguistic Core comprising:

a) a Blackboard data structure, for providing a shared knowledge repository over which a collection of natural language Agents can execute natural language processes on the processable data form, b) a collection of natural language Agents in communication with the blackboard, each Agent capable of providing a processing resource that may be usable for serving requests to execute a natural language process on the processable data form, and of determining, based on their respective capabilities and examination of the Blackboard, what requests for processing they can best serve, and c) a Dispatcher, in communication with Agents, among the collection of natural language Agents, that register with the Dispatcher, for coordinating the work of the registered Agents, for maintaining a high-level description of tasks to be completed to provide a solution to a given natural language engineering problem, and for determining the registered Agents that can best provide a solution to the given natural language engineering problem, wherein upon receipt of the processable data form, the high-level description of tasks to be completed is invoked, Agents to be invoked to execute those tasks are determined dynamically, based on features of the processable data form being processed, as determined by examination of the Blackboard and requests for processing, and the tasks so determined are executed by the Agents to generate an output of the Linguistic Core, such that the set of Agents applied to a given input can adapt, automatically and dynamically, to characteristics of the data, and (3) providing an Output Processor for converting the output of the Linguistic Core into a desired form, such that the input of text or documents is processed to generate results of the desired form.

\* \* \* \* \*